United States Patent [19]
Waldrop

[11] Patent Number: 6,050,075
[45] Date of Patent: Apr. 18, 2000

[54] LATERAL FLOAT APPARATUS FOR WINDROW PICKUP ATTACHMENT

[75] Inventor: T. William Waldrop, New Holland, Pa.

[73] Assignee: New Holland North America, Inc., New Holland, Pa.

[21] Appl. No.: 09/154,070

[22] Filed: Sep. 16, 1998

Related U.S. Application Data

[60] Provisional application No. 60/059,069, Sep. 16, 1997.

[51] Int. Cl.[7] .............................. A01D 34/03; A01D 43/02
[52] U.S. Cl. .............................................. 56/364; 56/15.9
[58] Field of Search ..................... 56/14.5, 14.6, 56/15.9, 364, 344

[56] References Cited

U.S. PATENT DOCUMENTS

| | | | |
|---|---|---|---|
| 3,154,903 | 11/1964 | Smith | 56/15.8 |
| 3,363,407 | 1/1968 | Drummond | 56/364 |
| 3,523,412 | 8/1970 | Dacyszyn | 56/364 |
| 3,684,026 | 8/1972 | Reuter et al. | 56/364 |
| 3,780,506 | 12/1973 | Tashiro | 56/14.5 |
| 4,187,666 | 2/1980 | McIlwain | 56/364 |
| 4,223,846 | 9/1980 | Priepke et al. | 241/60 |
| 4,266,391 | 5/1981 | McDuffie et al. | 56/14.5 |
| 4,266,392 | 5/1981 | Knepper et al. | 56/14.5 |
| 4,495,756 | 1/1985 | Greiner et al. | 56/364 |
| 4,567,719 | 2/1986 | Soots et al. | 56/364 |
| 4,843,804 | 7/1989 | Wellman | 56/15.8 |
| 5,522,670 | 6/1996 | Gilmore et al. | 404/83 |

OTHER PUBLICATIONS

IDASS Publication dated Nov. 1994—p. 3 Claas Brochure For Forage Harvester Jaguar Models 880, 860, 840 and 820—p. 17.

*Primary Examiner*—Thomas B. Will
*Assistant Examiner*—Meredith C. Petravick
*Attorney, Agent, or Firm*—Frank A. Seemar; Larry W. Miller; J. William Stader

[57] ABSTRACT

A windrow pickup attachment for a forage harvester having a crop processing device including an input opening for receiving crop material. The attachment includes a main frame positioned on the front of the forage harvester adjacent the input opening with a transverse reel and an auger conveyor mounted on the main frame for picking up crop material from the ground, consolidating it and conveying it to the forage harvester base unit via the input opening. An intermediate frame assembly is mounted on the forage harvester. The main frame of the attachment is pivotally mounted on the intermediate frame for rotation of the reel and conveyor about an axis extending in a generally for and aft direction to permit the position of the reel assembly to change from a home position under conditions where the ground is substantially level to left or right tilt positions in response to the contour of the ground.

6 Claims, 6 Drawing Sheets

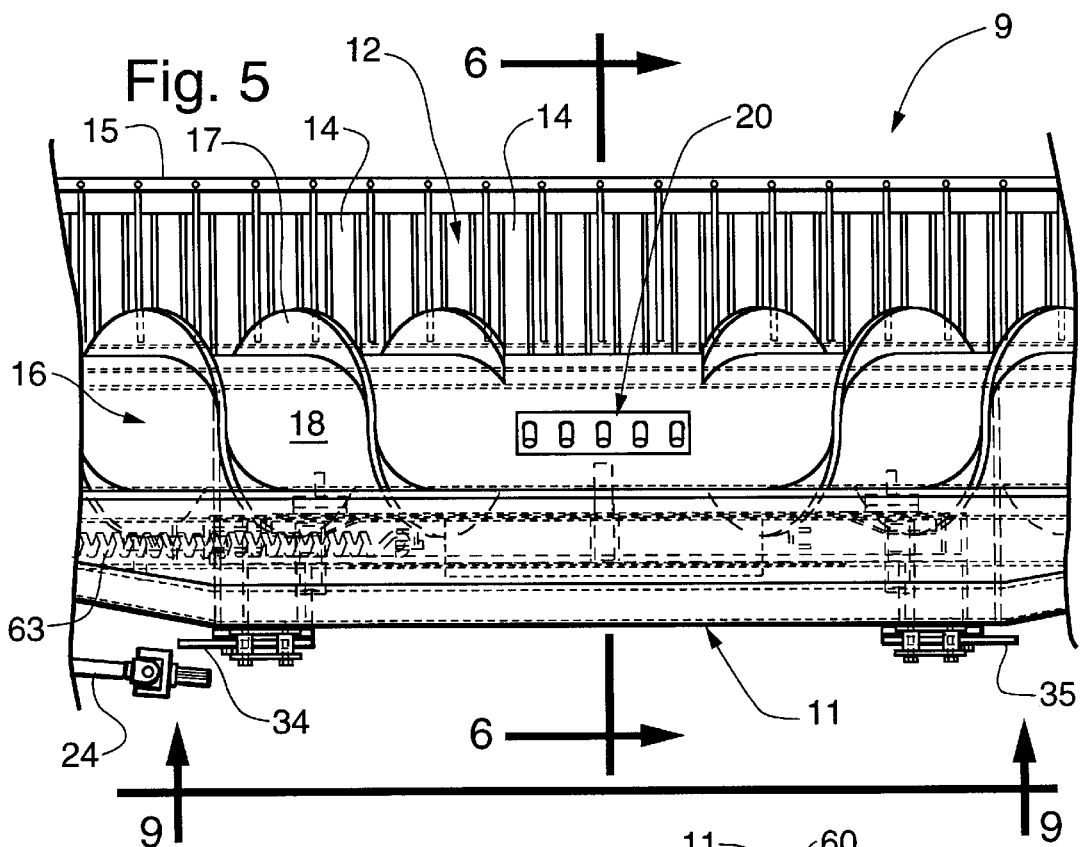
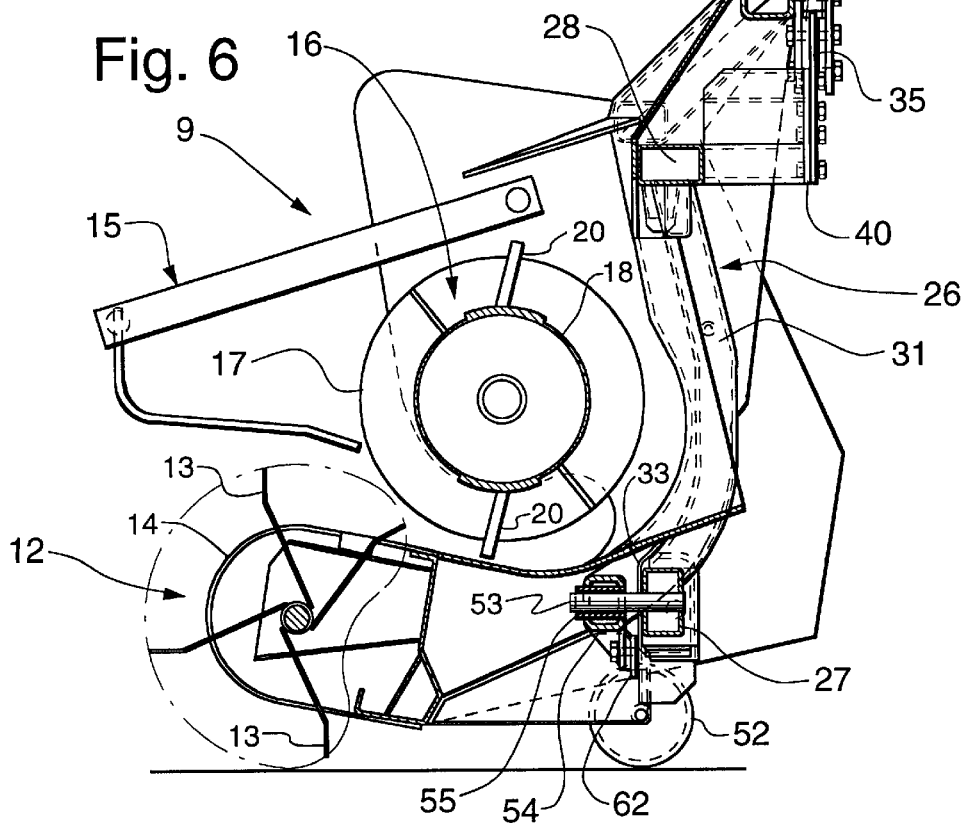

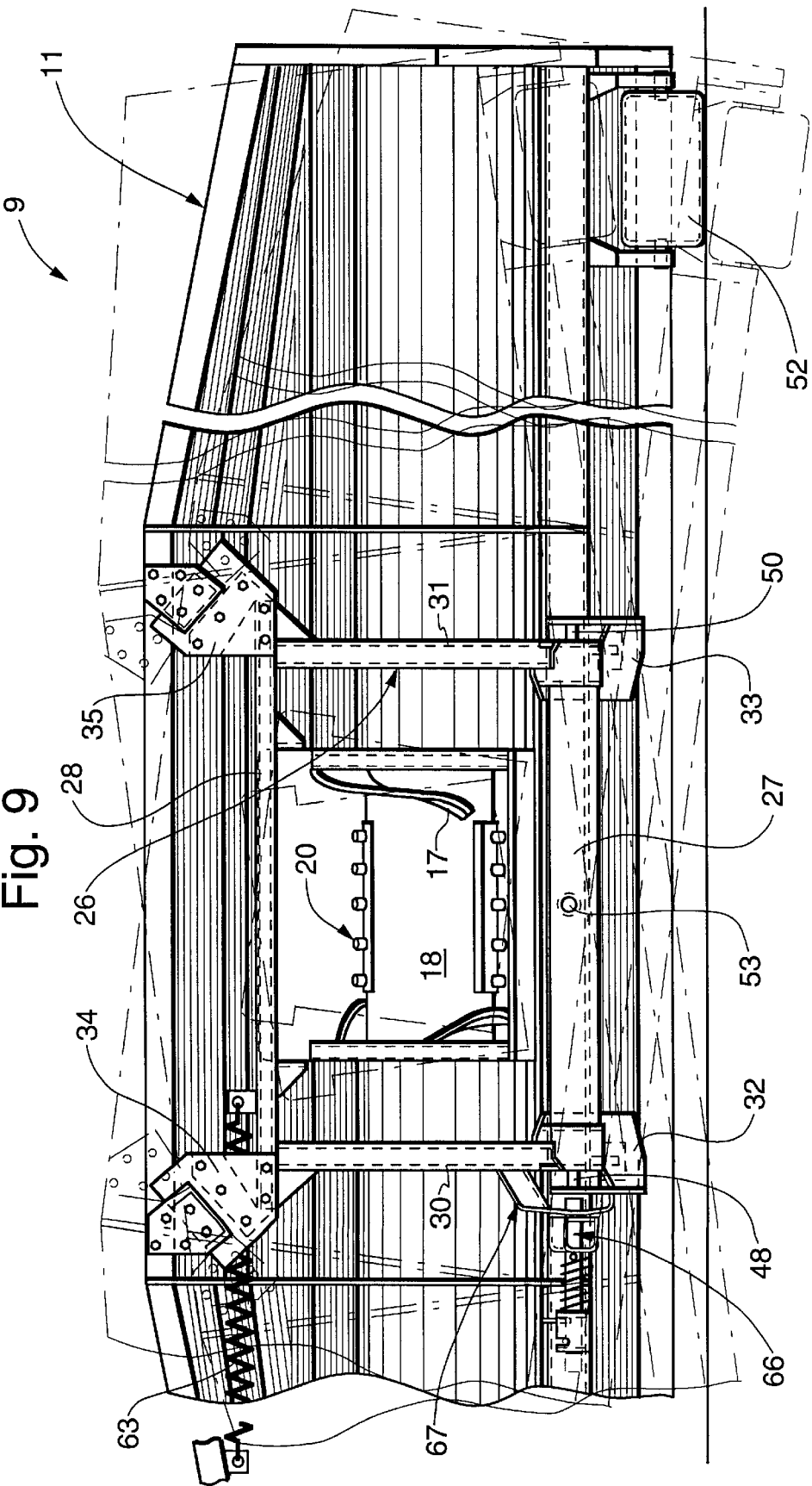

under which the vehicle is traveling. When this situation occurs, the lateral float mechanism, to be described in detail below, permits the pickup reel and auger to rotate about the longitudinal axis into an orientation where the reel and auger are in tilted positions relative to the base unit of the harvester, as shown in FIG. 2.

LATERAL FLOAT APPARATUS FOR WINDROW PICKUP ATTACHMENT

CROSS REFERENCE TO RELATED APPLICATION

This application claims the benefit of U.S. Provisional Application Ser. No. 60/059,069, filed Sep. 16, 1997, and entitled "Windrow Pickup Attachment for Forage Harvester".

FIELD OF THE INVENTION

The present invention relates generally to crop gathering attachments for agricultural harvesting machines and more particularly to lateral float apparatus for a windrow pickup attachment for forage harvesters.

BACKGROUND OF THE INVENTION

The well known agricultural practice of forage harvesting consists of cutting either green or mature crop material into discrete particles, and conveying the particles from the field to a storage facility, such as a silo. While in storage the crop material undergoes an acid fermentation to give the particles an agreeable flavor and to prevent spoilage. This overall operation, which is commonly referred to as an ensilage process, converts standing crop in the field to livestock feed, generally called silage.

An essential piece of farm machinery used for producing silage is the forage harvester which is adapted to gather standing or windrowed crop material from the field, chop it into small particles and then convey the cut crop material to a temporary storage receptacle, such as a wagon. Harvesters of this type are either self propelled or pulled by a tractor. Typically, forage harvesters comprise a base unit having a rotary cutter having a generally cylindrical configuration with knives peripherally mounted to cooperate with a stationary shear bar for cutting material by a shearing action as it is passed across the surface of the bar. The chopped crop material is then discharged from the harvester through a spout which directs the flow of crop material to a wagon towed behind or along side the harvester. U.S. Pat. No. 4,223,846, issued Sept. 23, 1980 in the name of E. H. Priepke et al, shows a self propelled forage harvester that has a general configuration that is typical of prior art base units.

Forage harvesters, regardless of the type, i.e., both self propelled or pull type, have a crop gathering attachment that initially encounters crop material, as the harvester moves across the field. As mentioned above, the crop being harvested is either standing, such as row crops, or windrowed. In the case of windrowed crop, a pickup attachment, extending from the front of the harvester, typically includes a reel consisting of a plurality of fingers, each of which is moveable through a predetermined path for engaging and picking up the windrowed crop material from the ground. The fingers urge the crop material rearwardly over side-by-side stripper plates that define slots through which the fingers extend. The stripper plates terminate in the general vicinity of a transverse auger that consolidates the crop material and feeds it through a rear opening in the header to the base unit of the harvester for processing. A typical forage harvester windrow pickup attachment is shown in U.S. Pat. No. 4,495,756, issued on Jan. 29, 1985 in the name of J. G. Greiner, et al, hereby incorporated by reference.

Prior art pickup attachments have been either rigidly attached to the base unit or have been pivotally mounted to allow lateral floating action. Lateral floating has an increasingly greater importance as attachments with increasing widths become more prevalent, because the wider attachments are more susceptible to changes in the ground contour. A change in such contour could result in one end of a rigidly mounted pickup being raised above the windrow material in the field over which it is being operated. This causes the crop to be bypassed, leading to inefficient operation. A header provided with the capability to laterally float, and thereby follow the ground contour, enables the header to be more effective over a wider area, resulting in improved operation by reducing losses. An example of a prior art forage harvester attachment with lateral float capabilities is shown in IDASS brochure, dated November, 1994.

SUMMARY OF THE INVENTION

One object of the present invention is to provide a forage harvester pickup attachment having a lateral float mechanism that dampens rotation of the structure during operation.

Another object of the present invention is to provide a forage harvester pickup attachment having a lateral float mechanism that relieves the tendency of the attachment to twist when uneven loading is caused by operating conditions.

A further object of the present invention is to provide a forage harvester pickup attachment having lateral float apparatus that maintains a smooth path of rotation with enhanced durability and serviceability.

In pursuance of these and other important objects the present invention contemplates improvements to a windrow pickup attachment for a forage harvester having crop processing means including an input opening for receiving crop material. The attachment comprises a main frame positioned on the front of the forage harvester adjacent the input opening, and a transverse reel mounted on the main frame for picking up crop material from the ground. The reel includes a series of tines projecting outwardly from a series of stripper plates for engaging crop material and urging it upwardly and rearwardly. A conveyor, also mounted on the main frame, comprises an auger located rearwardly of the reel for consolidating crop material under conditions where it is urged rearwardly by the reel, and means for feeding the consolidated crop material to the crop processing means via the input opening. More particularly the invention contemplates an intermediate frame assembly mounted on the forage harvester, means for pivotally mounting the main frame on the intermediate frame for rotation of the reel and conveyor about an axis extending in a generally for and aft direction to permit the position of the reel assembly to change from a home position under conditions where the ground is substantially level to left or right tilt positions in response to the contour of the ground, and means for dampening the rotation.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE DRAWINGS

FIG. 5 is plan view showing the intermediate frame assembly of the present invention coupled to the windrow pickup attachment.

FIG. 6 is a cross sectional view taken in the direction of arrows 6—6 in FIG. 5.

FIG. 9 is a cross sectional view taken in the direction of arrows 9—9 in FIG. 5.

DESCRIPTION OF THE PREFERRED EMBODIMENT

Figure 1:
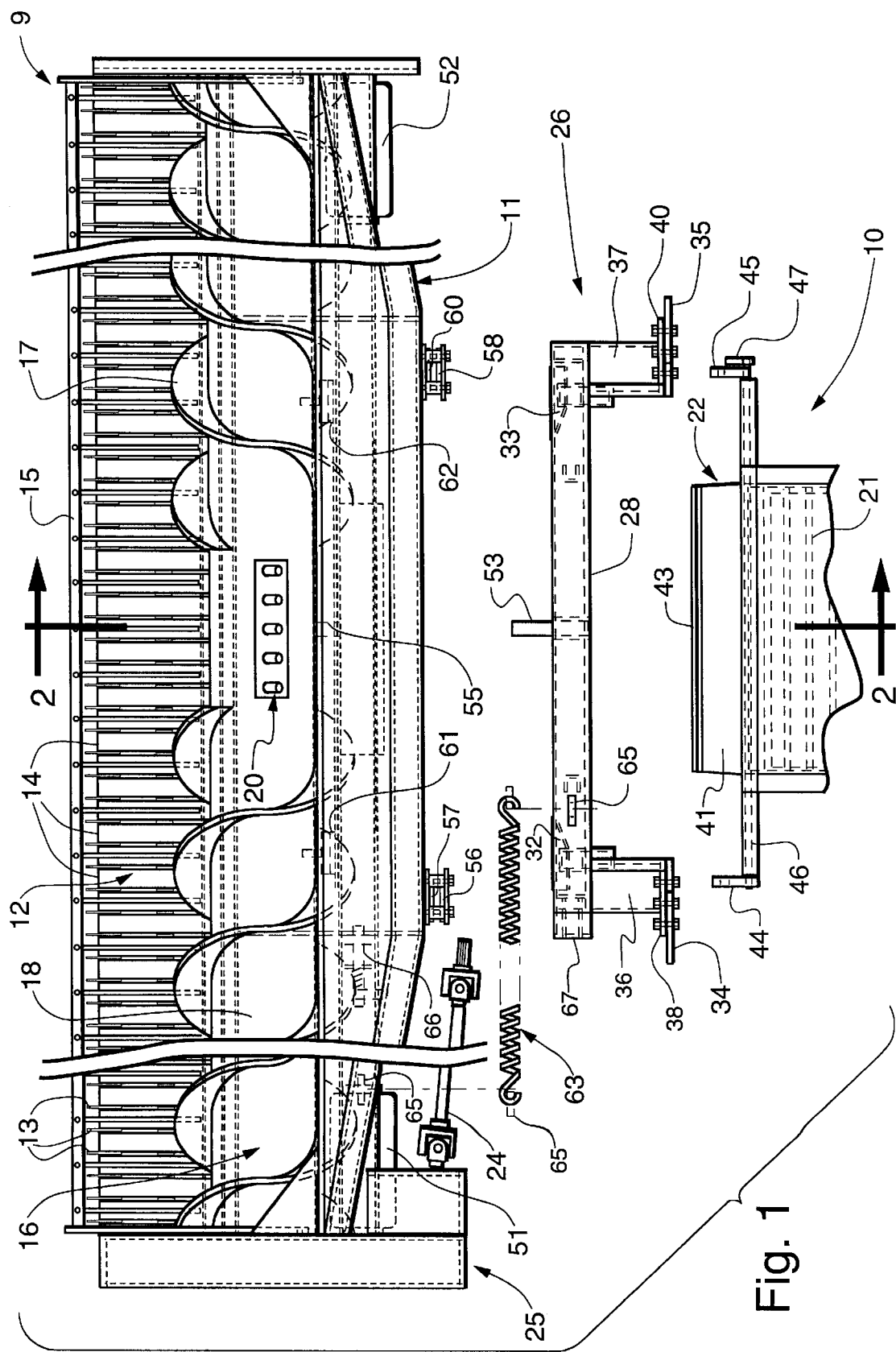
FIG. 1 is a exploded plan view showing an improved windrow pickup attachment for a forage harvester in which the preferred embodiment of the present invention is shown with the intermediate frame assembly separated form the pickup.
Figure 2:
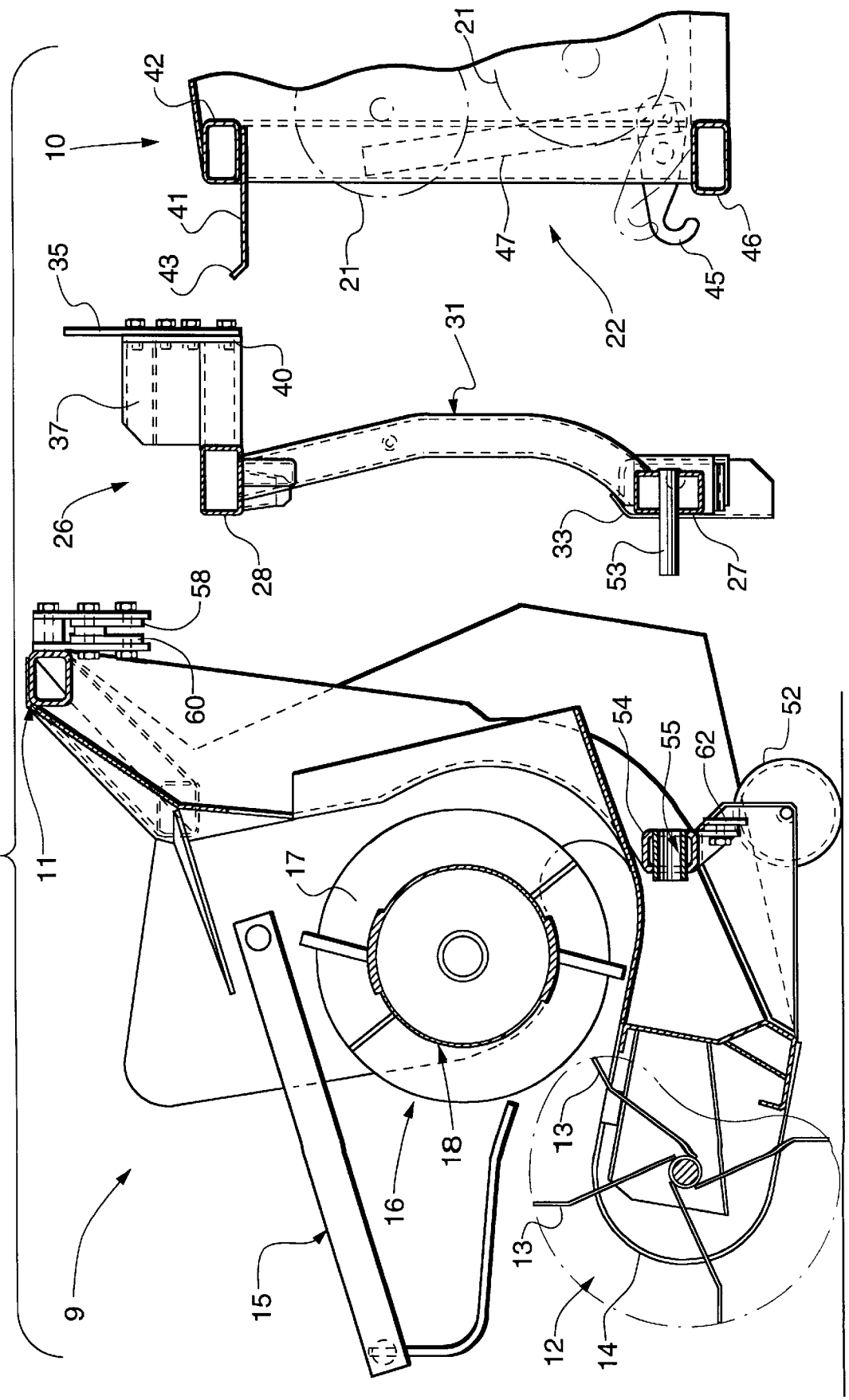
FIG. 2 is a is a cross sectional view taken in the direction of arrows 2—2 in FIG. 1.

Referring now to the drawings for a more detailed description of one embodiment of the present invention, FIGS. 1 and 2 show a windrow pickup attachment 9 mounted on the front end of a forage harvester, a portion of which is generally designated by reference numeral 10. The attachment comprises a frame 11, a pick-up reel 12, mounted on the frame, with conventional rotatable tines 13 operatively extending between stripper plates 14 for lifting windrowed crop material from the ground and urging it rearwardly over stripper plates 14 in a manner well known in the art. A wind guard 15 for restricting upward movement of the crop is pivotally mounted forward of an auger 16 also mounted on frame 11. The auger comprises flighting 17 extending from tube 18, and centrally located retractable fingers 20. Auger 16 is operable to convey crop through a central opening in the rear wall of attachment 9 towards feed rolls 21 mounted in the vicinity of the input opening 22 of the base unit of forage harvester 10. The feed rolls 21 receive the crop material conveyed through opening 22 and feed it to a rotating cutter assembly (not shown) in the base unit for processing in a conventional manner. Drive to reel 12 and auger 16 is accomplished via PTO 24 and conventional drive elements enclosed in housing 25.

It should be noted that flighting 17 of auger 18 comprises oppositely wound sections at the ends of tube 18 for consolidating the gathered crop material at a central region of auger 16 under conditions where auger 16 is being rotated. Retractable fingers 20 disposed at the central region of auger 16 are operable to project into the gathered crop and propel it rearwardly towards opening 22 whereupon feed rolls in the harvester base unit engage the crop and continue to convey it rearwardly as mentioned above.

Also shown in FIGS. 1 and 2 is intermediate frame assembly 26, comprising a transverse lower cross beam 27, a transverse upper cross beam 28, and vertical side beams 30, 31 formed into a generally rectangular configuration around the periphery of the opening in the rear wall of pickup attachment 9. This relationship of intermediate frame assembly 26 and the opening is clearly depicted in FIG. 9 wherein assembly 26 is shown attached at the rear of pickup attachment 9 in its normal operative position. Lower plates 32, 33 extend downwardly from lower cross beam 27, and upper plates 34, 35 extend upwardly from upper cross beam 28. The upper plates are affixed via intermediate mounting brackets 36, 37, having an integral flange 38, 40 to which the plates are attached.

Figure 3:
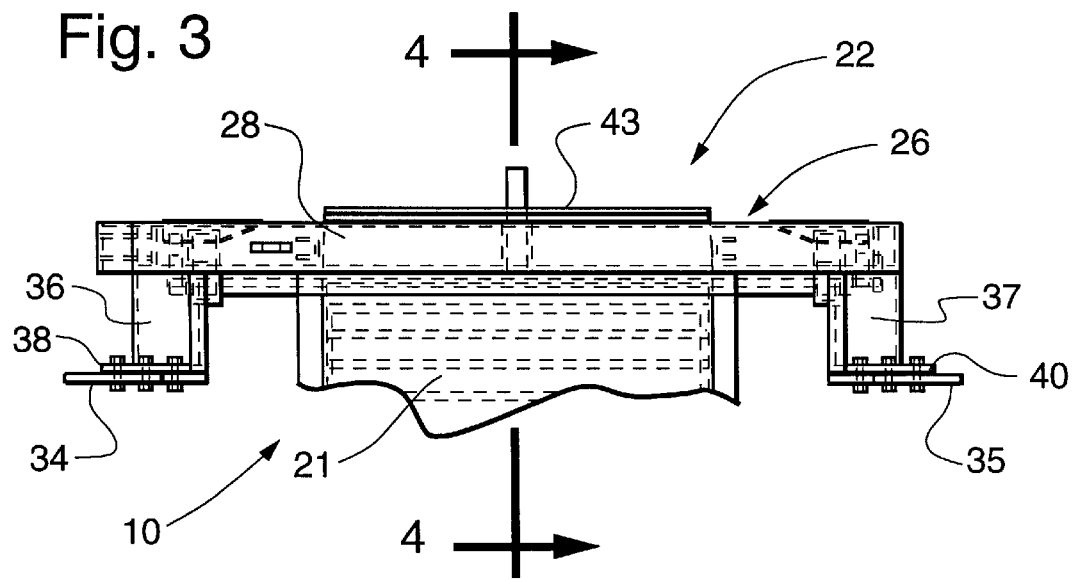
FIG. 3 is a plan view showing the intermediate frame assembly of the present invention attached to the front end of a forage harvester.
Figure 4:
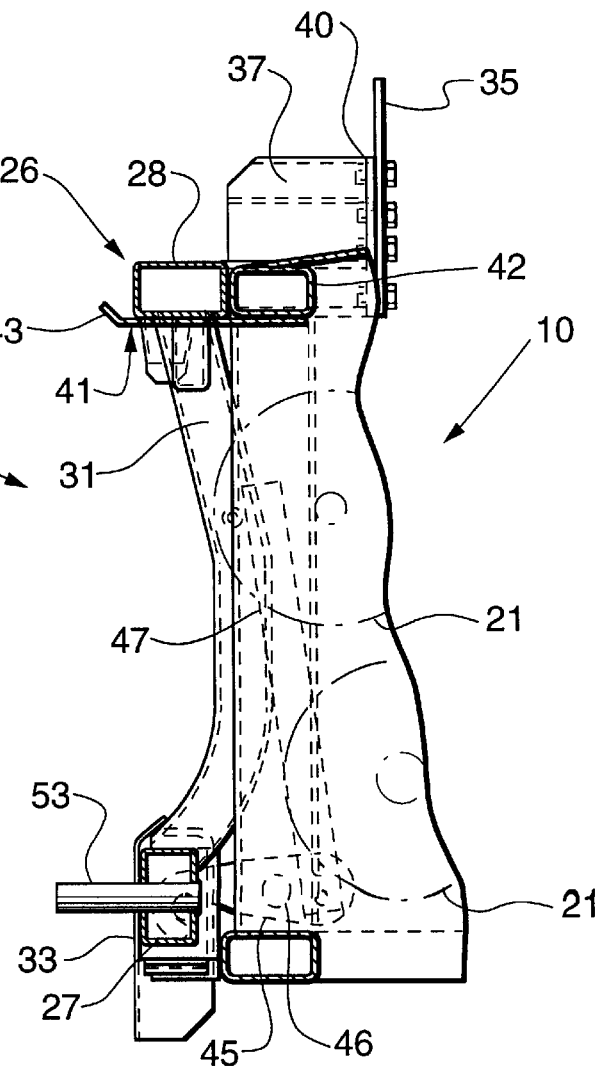
FIG. 4 is a cross sectional view taken in the direction of arrows 4—4 in FIG. 3.

Now turning to FIGS. 3 and 4, mounting bracket 41 extends from forage harvester cross beam 42 into the opening of intermediate assembly 26 for supporting upper cross beam 28 which nests within the upturned end flange potion 43 of bracket 41. Simultaneously, mounting hooks 44, 45 are pivoted via shaft 46 and pivot handle 47 to the phantom outline position (see FIG. 2) to engage coupling pins 48, 50 (see FIG. 9) on intermediate assembly 26.

Referring now to FIGS. 5 and 6, pickup attachment 9, supported on the ground by rollers 51, 52, is mounted on intermediate frame assembly 26 via pivot shaft 53 extending from lower crossbeam 27. Pivot shaft 53 is rotatably mounted in lower frame member 54 of frame 11 via cylindrical pivot shaft retainer 55, which pivotally receives pivot shaft 53. Two pairs of wear pads 56, 57 and 58, 60 are mounted on pickup frame cross beam to receive plates 34, 35, respectively. A lower pair of wear pads 61, 62 are mounted on lower frame member 54 for operative engagement with lower plates 32, 33, respectively.

Figure 7:
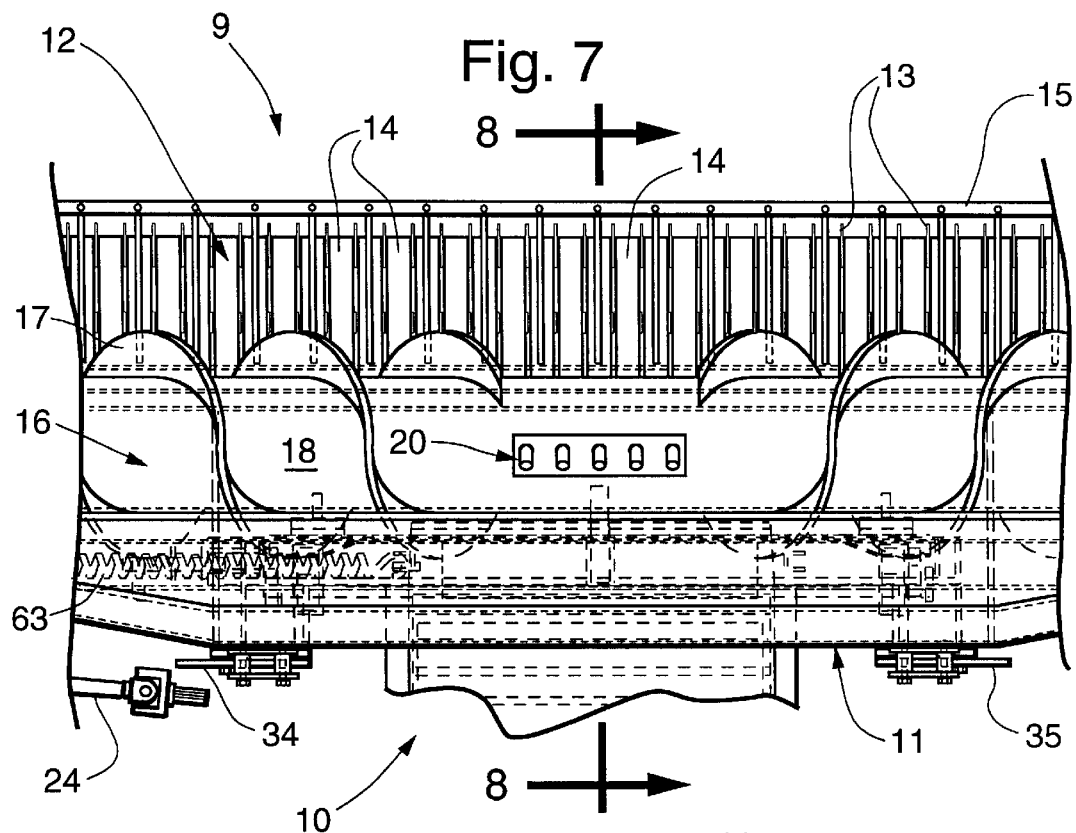
FIG. 7 is a plan view showing the intermediate frame assembly of the present invention attached to the front end of a forage harvester and coupled to the windrow attachment.
Figure 8:
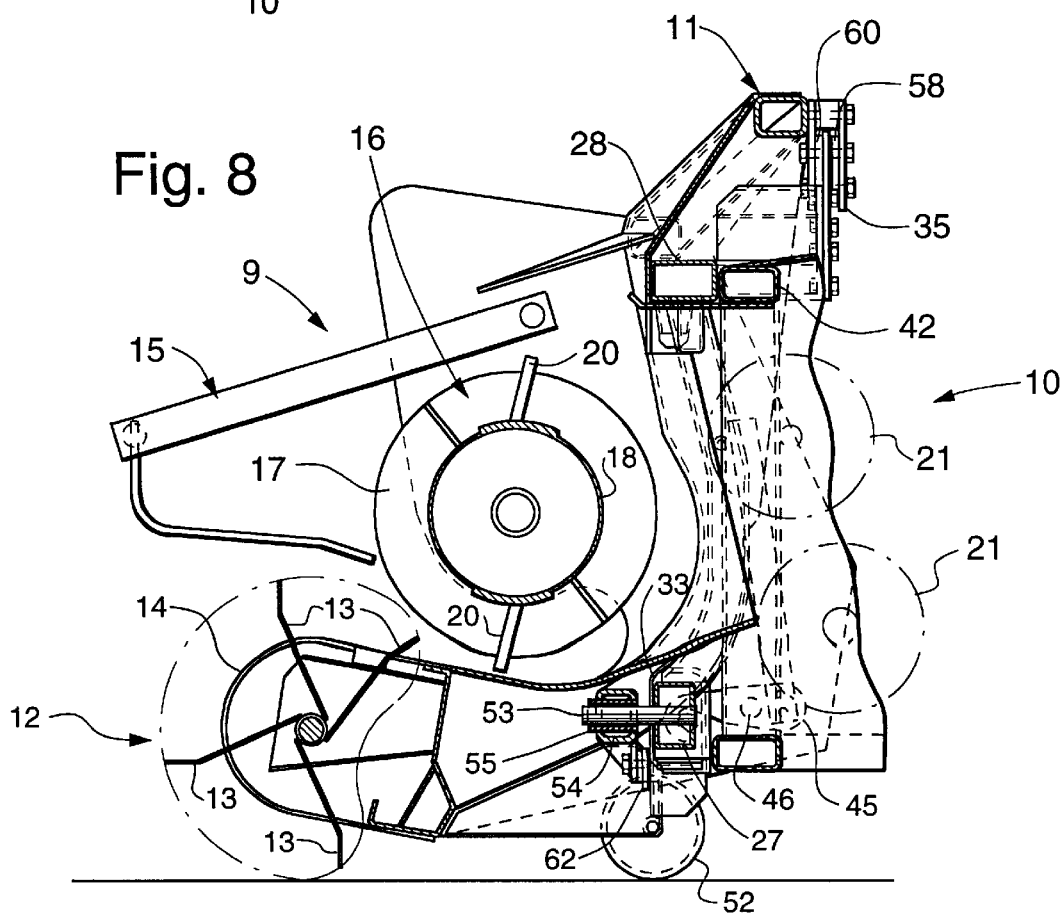
FIG. 8 is a cross sectional view taken in the direction of arrows 8—8 in FIG. 7.

These unique groups of wear pads and associated plates are at the heart of the present invention. Under conditions where attachment 9 is attached to forage harvester 10 via intermediate assembly 26, as shown in FIGS. 7 and 8, contact between the frame of pickup attachment and intermediate frame assembly 26 is constrained by friction between the pads and plates to dampen motion caused by rotation of the pickup, as it responds to variations in the contour of the terrain over which it is being operated. Rotation about pivot shaft 53 permits tines 13 to reach a point approximately 12 inches beneath the normal surface of the ground, as illustrated in FIG. 9 by the phantom outline of the various elements of the attachment. Thus, when a recess in the surface of the ground is encountered by one of the rollers the attachment pivots laterally under the constraints of pads 56, 57, 58, 60, 61, 62 to permit the tines 13 to operate in the recess, after which the pickup attachment is returned to its normal transverse level position by ground contact and/or leveling spring 63, secured between mounting tabs 64, 65 on the pickup frame and the upper cross beam 28 of intermediate frame assembly 26. By virtue of the close proximity of pivot shaft 53 to opening 22, crop feed to the feed rolls is not adversely affected under lateral pivoting motion of the attachment. A spring loaded latch pin 66 (see FIG. 9) engages an aperture in bracket 67 to prevent pivoting and thereby hold attachment 9 in its level position during transport.

Of the many implicit and explicit advantages of the present invention, one considered to be very important is the manner in which the tendency of the header to twist is relieved by the lateral positioning of the pads and plate groups. Another equally as important advantage is the simplicity with which coupling is accomplished between the base unit and intermediate frame assembly 26 without sacrificing structural integrity.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. An improved windrow pickup attachment for a forage harvester having crop processing means including an input opening for receiving crop material, said attachment comprising a main frame positioned on the front of said forage harvester adjacent said input opening, a transverse reel mounted on said main frame for picking up crop material from the ground, said reel including a series of tines projecting outwardly from a series of stripper plates for engaging crop material and urging it upwardly and rearwardly, and a conveyor mounted on said main frame for receiving crop material from said reel, said conveyor comprising an auger located rearwardly of said reel for consolidating crop material under conditions where it is urged rearwardly by said reel, said conveyor further comprising means for feeding said consolidated crop material to said crop processing means via said input opening, the improvement comprising an intermediate frame assembly mounted on said forage harvester, means for pivotally mounting said main frame on said intermediate frame for rotation of said reel and conveyor about an axis extending in a generally for and aft direction to permit the position of said reel assembly to change from a home position under conditions where the ground is substantially level to left or right tilt positions in response to the contour of the ground, and means for dampening said rotation, said means for dampening comprise at least one vertically disposed plate mounted generally transversely on said intermediate member, and cooperating means on said main frame operatively associated with said plate to provide continuous frictional engagement therewith for providing dampening under conditions where said assembly is moving relative to said intermediate frame assembly.

2. A windrow pickup attachment as set forth in claim 1 wherein means are provided for automatically returning said mainframe to said home position from said left or right tilt positions.

3. A windrow pickup attachment as set forth in claim 1 wherein said cooperating means comprise at least one pair of opposing wear pads mounted to receive said at least one plate therebetween.

4. A windrow pickup attachment as set forth in claim 1 wherein said means for damping comprise a pair of plates mounted equidistant from said axis on said intermediate member, and a like pair of opposing wear pads for frictionally engaging said pair of plates.

5. A windrow pickup attachment as set forth in claim 4 wherein said means for pivotally mounting said main frame comprise a pivot assembly having a centrally located pivot shaft extending from said intermediate member below said input opening, and a cylindrical pivot shaft retainer on said main frame for operatively receiving said pivot shaft.

6. A windrow pickup attachment as set forth in claim 5 wherein means are provided for automatically returning said mainframe to said home position from said left or right tilt positions.

\* \* \* \* \*